(12) United States Patent
Nielsen et al.

(10) Patent No.: US 9,865,896 B2
(45) Date of Patent: Jan. 9, 2018

(54) STACK ASSEMBLY COMPRISING FLEXIBLE COMPRESSION FORCE MAT

(75) Inventors: Martin Refslund Nielsen, Birkerød (DK); Jacob Breiner, Kvistgaard (DK); Niels Erikstrup, Frederiksberg C (DK)

(73) Assignee: Haldor Topsoe A/S, Lyngby (DK)

( * ) Notice: Subject to any disclaimer, the term of this patent is extended or adjusted under 35 U.S.C. 154(b) by 292 days.

(21) Appl. No.: 14/351,435

(22) PCT Filed: Oct. 14, 2011

(86) PCT No.: PCT/EP2011/005165
§ 371 (c)(1),
(2), (4) Date: Apr. 11, 2014

(87) PCT Pub. No.: WO2013/053374
PCT Pub. Date: Apr. 18, 2013

(65) Prior Publication Data
US 2014/0234744 A1    Aug. 21, 2014

(51) Int. Cl.
*H01M 8/24* (2016.01)
*H01M 8/02* (2016.01)
*H01M 8/2465* (2016.01)
*H01M 8/2475* (2016.01)
*H01M 8/248* (2016.01)
(Continued)

(52) U.S. Cl.
CPC ............ *H01M 8/2465* (2013.01); *C25B 9/18* (2013.01); *H01M 8/248* (2013.01); *H01M 8/2475* (2013.01); *H01M 8/2485* (2013.01); *H01M 2008/1293* (2013.01)

(58) Field of Classification Search
CPC .. H01M 8/2465; H01M 8/2475; H01M 8/248; H01M 8/2485; C25B 9/18
See application file for complete search history.

(56) References Cited

U.S. PATENT DOCUMENTS 4,728,585 A * 3/1988 Briggs ................ H01M 8/2465
                                                204/270
2007/0015035 A1* 1/2007 Izenson ............... H01M 8/0206
                                                429/444
(Continued)

FOREIGN PATENT DOCUMENTS

CN    101246846 A    1/2009
CN    101647144 A    2/2010
(Continued)

OTHER PUBLICATIONS

"Aspen Aerogels Pyrogel Product Data Sheet", retrieved on Feb. 9, 2016 from: http://www.aerogel.com/_resources/common/userfiles/file/Data%20Sheets/Pyrogel_XT-E_DS.pdf.*

Primary Examiner — Kenneth Douyette
(74) Attorney, Agent, or Firm — Blank Rome LLP (57) ABSTRACT

A solid oxide fuel or solid oxide electrolysis cell Stack assembly (203) has an improved, simple, cost reducing and robust compression System, housing and Single sided System interface with a flexible-interface-fixture (204) which is rigid enough to fix the at least one cell Stack in the housing when not in Operation, but flexible enough to allow for transfer of the compression force from the flexible compression mat (211) in the top closed end of the housing (201), through the at least one cell Stack and further towards the interface counterpart of the System when in Operation.

18 Claims, 6 Drawing Sheets

(51) Int. Cl.
*H01M 8/2485* (2016.01)
*C25B 9/18* (2006.01)
*H01M 8/124* (2016.01)

(56) References Cited

U.S. PATENT DOCUMENTS

| | | | | |
|---|---|---|---|---|
| 2007/0054172 | A1* | 3/2007 | Ueda | H01M 8/2475 |
| | | | | 429/468 |
| 2007/0238004 | A1* | 10/2007 | Osenar | H01M 8/0286 |
| | | | | 429/434 |
| 2008/0182152 | A1* | 7/2008 | Erikstrup | H01M 8/04067 |
| | | | | 429/433 |
| 2009/0214900 | A1* | 8/2009 | Hoffjann | H01M 8/0202 |
| | | | | 429/413 |
| 2010/0143814 | A1 | 6/2010 | Harrington et al. | |
| 2011/0244355 | A1 | 10/2011 | Skala | |

FOREIGN PATENT DOCUMENTS

| | | |
|---|---|---|
| CN | 102007618 A | 4/2011 |
| DE | 102 50 345 A1 | 5/2004 |
| EP | 2 006 944 A2 | 12/2008 |
| WO | WO 2010/102815 A1 | 9/2010 |
| WO | WO 2010/108530 A1 | 9/2010 |

\* cited by examiner

STACK ASSEMBLY COMPRISING FLEXIBLE COMPRESSION FORCE MAT

The invention relates to an assembly for a solid oxide fuel cell (SOFC) stack or a solid oxide electrolysis cell (SOEC) stack, more specifically to an enclosing casing, which provides protection and compression for such a stack and an improved interface for connection of the assembly to an SOFC or an SOEC system.

The present invention relates to features outside the stack itself, and it can be used for both SOFC and SOEC. In the following the invention will however mainly be explained in relation to SOFC for the sake of simplicity. In the following often the SOFC stack or the SOEC stack will be referred to as merely the cell stack.

The electro-chemical reactions and the function of a fuel cell is not the essence of the present invention, thus this will not be explained in detail, but considered known for a person skilled in the art.

To increase the voltage produced by the SOFC, several cell units are assembled to form a stack and are linked together by interconnects. These layers of the stack are sealed together with a gas tight and temperature resistant seal such as glass along some or all edges. The interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell needing electrons for the reduction process. The current conduction between the interconnect and its neighbouring electrodes is enabled via a plurality of contact points throughout the area of the interconnect. The contact points can be formed as protrusions on both sides of the interconnect. The efficiency of the fuel cell stack is dependant of good contact in each of these points, and therefore it is crucial that a suitable compression force is applied to the fuel cell stack. This compression force must be large enough and evenly distributed throughout the area of the fuel cell to ensure electrical contact, but not so large that it damages the electrolyte, the electrodes, the interconnect or impedes the gas flow over the fuel cell. The compression of the fuel cell is also vital for the seal between the layers of the stack to keep the stack gas tight.

The present invention relates to cell stacks with both internal manifolding and stacks with external (side) manifolding. By internal manifolding is meant that the process gas distribution from a gas inlet or outlet to or from each of the cells in the cell stack is provided by a manifold which is located physically within/integrated in the substantially box shaped cell stack, whereas external manifolding means that the process gas distribution from a gas inlet or outlet to or from each of the cells in the cell stack is provided by a manifold which is located physically outside, adjacent to the substantially box shaped cell stack.

Though external manifolded cell stacks have a higher performance than internal manifolded cell stacks they require gas manifolds that lead the gas to and away from the cell stack. Obtaining sealing with small leakages of the external manifolds is a known technical problem, a problem which is important to solve, since gas leakages have a negative impact on the system efficiency.

External manifolded cell stacks normally have an interface that is difficult to connect to a solid oxide fuel cell (or solid oxide electrolysis cell) system. By solid oxide fuel cell system (or solid oxide electrolysis cell system) is meant the surrounding parts necessary for the cell stack to operate, i.e. process gas pre-treatment (air-blowers, heat-exchangers, gas reformers etc.) and delivery, process gas withdrawal and after-treatment, electrical power take-out, thermal insulation, vibration damping, measuring equipment etc. This is caused by the fact that external manifolded cell stacks normally have the process gas connections on three different sides of the substantially box shaped cell stack. Often these results in manifold designs where four tubes need individual fitting with gaskets, clamps or likewise to the solid oxide fuel cell system's tubing. This kind of tube connections results in several problems:

Tube connections occupy space consuming and result in larger solid oxide fuel cell systems. Larger solid oxide fuel cell systems result in bigger heat loss, larger amount of necessary thermal insulation, and in general larger production costs. In addition to this, compactness is an important parameter in order to fit the solid oxide fuel cell system in products with a limited amount of space e.g. trucks.

In order to be able to mount and obtain a long life and a tight fit to all of the tube connections, compensators need to be fitted to all or some of the tubes to make up for relative dimension deviations from tube to tube caused by manufacturing and/or differences in thermal expansion due to operation conditions. This is a problem since compensators are expensive, mechanically fragile, thin walled, take up space and have a large heat loss.

The risk of a malfunction (leakage) increases with the number of connections.

Four individual fittings are time consuming to mount.

Known tube connections can be difficult to loosen up after use, as metal parts tend to seize together.

Manifolds and compression arrangements often require a large number of parts. This increases the risk of malfunction and total costs.

Compression arrangements are known to be cumbersome when installing cell stacks. Many compression arrangements require a shift from one compression arrangement to another when the cell stack is installed in a system. The overlapping of the forces from the two compression arrangements makes it difficult to stay in the desired compression force interval. This installation is often done manually and is time consuming, cumbersome and contains the risk of providing too much compression force, too little compression force and/or a bad distribution of the compression force. In addition to this; failure in compression arrangements is a known source of error in fuel cell systems.

It is known that SOFC and SOEC system start up time can be reduced by reducing system and stack mass.

Electric short circuiting is a known failure mode. The cell stack sides are charged with an electrical potential relative to the rest of the system and hence they are vulnerable regarding electrical short circuiting. The electrically positive side of the fuel cell stack must also be protected from short circuiting If a malfunction of a fuel cell stack occurs, fuel leakages can result in a safety problem. A serious malfunction of the cell stack can melt the cell stack and might damage surrounding components.

A solution to some of these problems has been proposed in US 2010143814, which is concerned with improved fuel cell stack assemblies, and methods of operation of a fuel cell stack assembly, particularly with improved gas flow and thermal management.

In DE10124853 a unit has a sealed housing in which there is a stack of fuel cells. During operation the cells are fed with gases that enter and exits through ports. Generated electrical current is taken off through terminals. The housing is produced from metal plates that are laser welded to provide a gas tight seal.

US2002168560A Describes a base manifold for a modular solid oxide fuel cell assembly which comprises a plurality of receiving areas for receiving a plurality of solid oxide fuel cell stacks; a fuel inlet passageway disposed between a manifold fuel inlet port and a plurality of stack fuel inlet ports; an oxidant inlet passageway disposed between a manifold oxidant inlet port and a plurality of stack oxidant inlet ports; a fuel outlet passageway disposed between a plurality of stack fuel outlet ports and a manifold fuel outlet port; and an oxidant outlet passageway disposed between a plurality of stack oxidant outlet ports and a manifold oxidant outlet port.

WO10102815 discloses a fuel cell or electrolysis cell stack that has force distribution members with one planar and one convex shape applied to at least its top and bottom face and in one embodiment further to two of its side faces. A compressed mat and further a rigid fixing collar surrounds the stack and force distribution members, whereby the stack is submitted to a compression force on at least the top and bottom face and potentially also to two side faces. The assembly is substantially gas tight in an axial direction of the primarily oval or circular shape and can be fitted with gas tight end plates to form robust gas inlet and outlet manifolds.

US2003235743A A solid-oxide fuel cell stack having a plurality of fuel cells connected in series and disposed as two stacks side-by-side in head-to-tail configuration, connected in series across one end and having cathode and anode current collectors mounted side-by-side on a stack base at the other end. Each current collector is a flat plate extending from the stack footprint. Surrounding the stacks is a cover-sealing flange so formed that when the cover is in place a thermal jacket is formed around the stacks. The current collectors are electrically insulated from the sealing flange and cover by a gasket, and extend outwards from the flange for electrical attachment to a load. This arrangement permits the stacks to be fully assembled and the stack cover secured and sealed in place without need for passing electrical leads through openings in the cover which must be subsequently sealed.

US2010062297A describes an invention which relates to a device comprising a thermally insulating receptacle and, arranged in the receptacle, at least one high-temperature fuel cell system component enclosed by at least one insulating layer of a first material, a clamping means acting on the insulating layer. In accordance with the invention it is provided for that, the clamping means comprises, supported by a receptacle housing and acting on the insulating layer, one or more plate-shaped elements made of a second material which is elastically deformable at a contact pressure, at which the first material is not deformable.

US2004072059 describes a container structure for a fuel cell comprises a fuel cell container, a separate plate having a plurality of orifices, an exhaust pipe discharging gas in the fuel cell container, and a compressed air pipe sending a compressed air into the fuel cell container. In the container structure, the inside of the fuel cell container is divided into an exhaust manifold unit and a cell housing unit housing the fuel cell by the separate plate, the exhaust pipe is attached to connect an exhaust port provided on the exhaust manifold unit and an exhaust outlet provided on a surface of a vehicle, an air pressure in the exhaust manifold unit is set at an atmospheric pressure, and an air pressure in the cell housing unit is set equal to or smaller than a fuel cell gas pressure and equal to or larger than the atmospheric pressure by the compressed air pipe.

In spite of the presented known solutions to the compression, the enclosing and the interface problems of a fuel cell or electrolysis cell stack, none of them present an improved solution to all of the presented problems as does the present invention as described in the following.

It is an object of the present invention to solve the mentioned problems by providing a new SOFC or SOEC stack assembly for at least one cell stack, suited for connection to a solid oxide fuel or electrolysis cell system.

In the following, the fuel cell stack will be regarded as a black box which generates electricity and heat when supplied with oxidation gas and fuel gas. The function and internal components of the fuel cell stack is considered known art and is not the subject of this invention.

SOFC or SOEC stacks can have many physical shapes, not limiting the present invention but for the reason of simplifying the disclosure of the invention, the following explanation and examples will take as a starting point a cell stack with substantially a box shape i.e. with six rectangular sides, eight corners and twelve edges placed in substantially rectangular connection three by three. In the following, the cell stack will thus be characterised as having a top face, a bottom face and a plurality of side faces. At least the top face and the bottom face need a compression force such that the top face is pressed towards the bottom face. Optionally, further two opposing side faces of the stack need a compression force against each other and in some cases further two opposing side faces need a compression force against each other. The at least one solid oxide fuel or electrolysis cell stack further comprises a fuel gas inlet, a fuel gas outlet, oxidant gas inlet and oxidant gas outlet. The SOFC or SOEC stack assembly further comprises a rigid housing with one substantially closed top end, one open bottom interface end opposite the substantially closed end and at least one side. The housing is substantially enclosing the at least one stack top face and the plurality of side faces, the open bottom interface end is adapted to be connected to an interface counterpart of said solid oxide fuel or electrolysis cell system and provides interface for fuel gas and oxidant gas between the at least one stack and the SOFC or SOEC system. To provide the necessary compression force for the at least one stack, there is at least one flexible compression force mat positioned inside the housing between the at least one stack top face and the substantially closed top end of the housing. The at least one flexible compression force mat may be both electrically isolating and thermally insulating. Further, at least one flexible fixation mat is positioned inside the housing between at least one of the plurality of stack side faces and the at least one side of the housing. Also the at least one flexible fixation mat may be both electrically isolating and thermally insulating.

To fix the stack in the housing and to provide at least a part of the interface of the SOFC or SOEC stack assembly towards the SOFC or SOEC system, the assembly further comprises a flexible-interface-fixture positioned adjacent to the open bottom interface end of the housing. The flexible-interface-fixture partly encloses the at least one stack within the housing and at least partly covers the bottom face of the at least one stack. The flexibility of the flexible-interface-fixture is defined as being rigid enough to provide fixture of the at least one stack in the housing when the stack is not in operation, i.e. it can provide a counterforce against the stack which is pressed in a direction out of the housing by the force from the compressed compression force mat; but still the flexible-interface-fixture is sufficiently flexible to allow for transfer of at least a part of the compression force from the compression force mat through the at least one stack, further through the flexible-interface-fixture and against the interface counterpart of the SOFC or SOEC system when the at least one stack is in operation.

Though it may seem difficult to achieve both these counteracting objectives of flexibility contra rigidity, the task is considerably facilitated by the fact that there is a large difference between the temperature of the flexible-interface-fixture when the at least one stack is in operation and when not in operation. A range of materials can therefore provide the aforementioned characteristic, e.g. a metal plate is far more rigid at a temperature of circa 20° C. than at a temperature of 800° C. (examples). Some of the important inherent advantages of the invention as described above is that the thermal mass of the SOFC or SOEC stack assembly can be significantly reduced by means of the flexible-interface-fixture which is relatively thin as compared to known art interface base-plates and the number of components is reduced since the compression force mat provides compression force of the at least one stack as well as packing force of the flexible-interface-fixture towards the SOFC or SOEC system interface counterpart.

In an embodiment of the invention the necessary flexibility is achieved by a flexible-interface-fixture with a flexural stiffness between 0.01 Nm (Nm being Newton meters) and 5000 Nm, preferably between 0.1 Nm and 1000 Nm, preferably between and 1 Nm and 500 Nm at 20 C temperature. This flexibility ensures the necessary rigidity for fixing and compressing the cell stack in the housing when not connected to an SOEC or SOFC system and at the same time ensures the necessary flexibility to transmit at least a part of the compression force from the flexible compression force mat to the interface counterpart of the SOFC or SOEC system when in operation. The range of the flexural stiffness varies off course with the demands of the actual cell stack and system, which may vary widely with stack size, stack type and further parameters. The flexibility must therefore be chosen by the man skilled in the art by calculations of flexural stiffness in relation to the specific system demands or even by iterative experiments.

In an embodiment of the invention as described in the foregoing, the open bottom interface end of the housing and said flexible-interface-fixture are planar and has an external interface surface which is in substantially the same plane when connected to the interface counterpart of the solid oxide fuel or electrolysis cell system. This makes the interface and the connection of the assembly to an SOFC or an SOEC system simple and reduces the manufacturing costs. It is to be understood that since the flexible-interface-fixture is subjected to the compression force of the compression force mat, the interface surface will not be plane when the assembly is not connected to the interface counterpart of an SOFC or an SOEC system.

In a further embodiment of the invention, the connection of the assembly to an SOFC or an SOEC system is further simplified by the provision of a flange at the open bottom interface end of the housing. The flange can be an integrated part of the housing (i.e. cast in one piece), it can be attached to the housing in any known way such as welding, bracing, by screws or as also known as a loose flange, which acts against a mechanical stop or edge of the housing. In any case, the flange is suited for connection to the interface counterpart of the SOFC or SOEC system.

In a specific embodiment of the invention, the flexible-interface-fixture is a steel plate (e.g. inconel, 253 MA etc.) connected to the open bottom interface end of the housing. It can be attached to the housing by any known means such as welding, bracing, a mechanical fit etc. Further the thickness of the steel plate can be chosen to specifically match the requirements for flexibility for a given application. Applications may vary with size of the cell stack, number of cells, operating temperature, cell types etc. In an embodiment of the invention, the thickness of the flexible-interface-fixture is in the range of 0.1-5 mm, preferably in the range of 0.5-3 mm. The flexible-interface-fixture has a low thermal mass relative to known art housing base plates as it is thin and does not necessarily cover the entire open bottom interface end of the housing. When the cell stack is not in operation and the assembly is not connected to an interface counterpart of an SOFC or SOEC system, the open bottom interface end of the housing as well as the flexible-interface-fixture can be covered by a protection cover, which covers the entire open bottom interface end of the housing and thereby protects the cell stack within the housing. In an embodiment, the protection cover can be rigid and adapted to fit the flange connection of the housing so that a tight fit to the housing and compression of the cell stack is possible.

In an embodiment of the invention, the compression force which is transmitted from the compression force mat, to the cell stack and further to the flexible-interface-fixture is utilised to provide at least a part of a sealing force for a gasket which is provided between the bottom face of the at least one stack and the flexible-interface-fixture to provide a sealing between at least one fuel or oxidant gas inlet or outlet of the at least one stack and the flexible-interface-fixture when the assembly is connected to the interface counterpart of said system and the at least one stack is in operation. The gasket ensures that each of the process gas connections to and from the at least one cell stack is gas tight such that the process gasses are not unintentionally mixed which would reduce performance and potentially also be dangerous or damaging.

In an embodiment where the at least one cell stack has external manifolding for the oxidation gas and internal manifolding for the fuel gas, this embodiment further ensures a well defined sealing pressure to the critical fuel gas, since this pressure is at least partly provided by the compression force mat and therefore is less sensitive to the force by which the assembly is connected to the interface counterpart of the SOFC or an SOEC system. In this embodiment one side face of the at least one stack has external manifold oxidant gas inlet, one side face of the at least one stack has external manifold oxidant gas outlet and the bottom face of the at least one stack has internal manifold fuel gas inlet and internal manifold fuel gas outlet.

In yet a further embodiment of the invention, the at least one stack has external manifolding for both the oxidant gas inlet an outlet and the fuel gas inlet and outlet, and wherein the at least one flexible fixation mat provides a gas sealing between at least two of the gas inlets and outlets of the at least one stack. This embodiment reduces material costs and the number of components since the flexible fixation mat serves more purposes, fixation, gas sealing and thermal insulation.

In another embodiment, the at least one stack can have internal manifolding for both the oxidant gas inlet and outlet and the fuel gas inlet and outlet.

The housing of the assembly can be made by any conventional production method such as casting, deep-drawing, selective laser melting or welding, and it can be provided with stiffening and strengthening external and/or internal ribs. Further at least a part of these ribs can be adapted to provide flow guidance of at least a part of the oxidant or fuel gasses. This can be advantageous to ensure an even distribution of the process gasses to and from the at least one cell stack.

In a further embodiment of the invention, the stiffening and strengthening of the housing may be provided by profiles formed on at least one of the at least one sides of the housing. These profiles may serve more than this purpose as they can also provide space for further necessary elements of the assembly not mentioned in the above, such as current collectors.

The materials for the at least one compression force mat and also the at least one fixation mat may be, but is not restricted to, any of the following materials: ceramic, glass, metal or a combination of these, preferably porous calcium silicate or glass fibre reinforced calcium silicate or refractory ceramic fibre or glass fibre, preferably magnesia-silica fibre, alumina fibre with or without an amount of silica, low alkali aluminosilicate compositions containing one or more of the following oxides: zirconia, chromia or titania or vermiculite.

The invention as described has a range of advantages over the known art some of which are:

- A rigid heavy base plate with a large thermal mass is simply omitted from the cell stack assembly. Instead the rigid base and counterforce necessary for compression of the at least one stack and necessary to seal the assembly to a system interface counterpart is provided by that same system interface counterpart. Only a flexible-interface-fixture of low thermal mass is provided to fix the at least one stack in the housing when not in operation and/or not connected to a system interface counterpart.
- All process gas connections are positioned on one interface side of the cell stack assembly. In an embodiment this interface is a plane surface with a flange connection and the sealing pressure is well defined as it is provided by the compression force mat. This makes the connection of the cell stack assembly to the system interface counterpart simple, secure and cost reducing.
- The thermal mass of the housing is reduced by optimizing the material use and the strength by the use of strengthening ribs and/or profiles.
- The external manifolding which is an integrated part of the assembly provides a low pressure loss, thereby saving energy and process gas blower capacity. At the same time the simplicity of the construction of the external manifolding is cost reducing and failure minimizing.
- Leakage of process gas from the cell stack assembly is minimized as the cell stack is enclosed by the housing on all sides except the interface side which is sealed to the interface counterpart.
- The assembly is robust against rough handling and vibrations as weak and protruding parts are omitted and the stack is enclosed by a shock-absorbing layer and a hard shell, same principle as a protective helmet.
- A low cost price is obtained by minimizing the number of parts to save material cost and production/assembly time.

FEATURES OF THE INVENTION

1. Solid oxide fuel or electrolysis cell stack assembly suited for connection to a solid oxide fuel or electrolysis cell system, said assembly comprising
   at least one solid oxide fuel or electrolysis cell stack, the at least one stack comprises a plurality of fuel cells or electrolysis cells, the at least one stack comprises a top face, a bottom face, a plurality of side faces, fuel gas inlet, fuel gas outlet, oxidant gas inlet and oxidant gas outlet,
   a rigid housing with one substantially closed top end, one open bottom interface end opposite the substantially closed end and at least one side, the housing is substantially enclosing the at least one stack top face and the plurality of side faces, the open bottom interface end is adapted to be connected to an interface counterpart of said solid oxide fuel or electrolysis cell system and provides interface for fuel gas and oxidant gas between the at least one stack and said system,
   at least one flexible compression force mat positioned inside the housing between the at least one stack top face and the substantially closed top end of the housing, the compression force mat provides compression force for the at least one stack
   at least one flexible fixation mat positioned inside the housing between at least one of the plurality of stack side faces and the at least one side of the housing,
   wherein said assembly further comprises a flexible-interface-fixture positioned adjacent to the open bottom interface end of the housing whereby it at least partly encloses the at least one stack within the housing and at least partly covers the bottom face of the at least one stack, said flexible-interface-fixture is rigid enough to provide fixture of the at least one stack in said housing when the at least one stack is not in operation, but sufficiently flexible to allow for transfer of at least a part of the compression force from the compression force mat through the at least one stack, further through the flexible-interface-fixture and against the interface counterpart of the solid oxide fuel or electrolysis cell system when the at least one stack is in operation.

2. Solid oxide fuel or electrolysis cell stack assembly according to feature 1, wherein the flexural stiffness of the flexible-interface-fixture is between 0.01 Nm and 5000 Nm, preferably between 0.1 Nm and 1000 Nm, preferably between and 1 Nm and 500 Nm at 20° C.

3. Solid oxide fuel or electrolysis cell stack assembly according to any of the preceding features, wherein said open bottom interface end of the housing and said flexible-interface-fixture are planar, parallel and has an external interface surface which is in substantially the same plane when connected to the interface counterpart of the solid oxide fuel or electrolysis cell system.

4. Solid oxide fuel or electrolysis cell stack assembly according to any of the preceding features, wherein said open bottom interface end of the housing is provided with a flange suited for connection to the interface counterpart of the system, said flange can be an integrated part of the housing, or it can be attached to the housing by means of welding, bracing, screws or it can be a loose flange with a mechanical fit around the housing.

5. Solid oxide fuel or electrolysis cell stack assembly according to any of the preceding features, wherein the flexible-interface-fixture is a steel plate connected to the open bottom interface end of the housing.

6. Solid oxide fuel or electrolysis cell stack assembly according to any of the preceding features, wherein the flexible-interface-fixture is connected to the housing by means of welding, bracing, screws or a mechanical fit.

7. Solid oxide fuel or electrolysis cell stack assembly according to any of the preceding features, wherein the thickness of the flexible-interface-fixture is in the range of 0.1-5 mm, preferably in the range of 0.5-3 mm.

8. Solid oxide fuel or electrolysis cell stack assembly according to any of the preceding features, wherein the width of the flexible-interface-fixture corresponds to the inner width of the open bottom interface end of the housing, whereby the flexible-interface-fixture can be mounted inside said open bottom interface end of the housing.

9. Solid oxide fuel or electrolysis cell stack assembly according to any of the preceding features, wherein at least one gasket is provided between the bottom face of the at least one stack and the flexible-interface-fixture to provide a sealing between at least one fuel or oxidant gas inlet or outlet of the at least one stack and the flexible-interface-fixture, and wherein the pressure necessary to provide a gas tight seal of said gasket is provided at least partly by the flexible compression force mat when the assembly is connected to the interface counterpart of said system and the at least one stack is in operation.

10. Solid oxide fuel or electrolysis cell stack assembly according to any of the preceding features, wherein the at least one stack has external manifolding for the oxidant gas and internal manifolding for the fuel gas, one side face of the at least one stack has external manifold oxidant gas inlet, one side face of the at least one stack has external manifold oxidant gas outlet and the bottom face of the at least one stack has internal manifold fuel gas inlet and internal manifold fuel gas outlet.

11. Solid oxide fuel or electrolysis cell stack assembly according to any of the features 1-8, wherein the at least one stack has external manifolding for both the oxidant gas inlet and outlet and the fuel gas inlet and outlet, and wherein the at least one flexible fixation mat provides a gas sealing between at least two of the gas inlets and outlets of the at least one stack.

12. Solid oxide fuel or electrolysis cell stack assembly according to any of the features 1-8, wherein the at least one stack has internal manifolding for both the oxidant gas inlet and outlet and the fuel gas inlet and outlet.

13. Solid oxide fuel or electrolysis cell stack assembly according to any of the preceding features, wherein the housing is made by casting, deep-drawing, laser sintering or welding, and wherein the housing is provided with stiffening and strengthening external and/or internal ribs.

14. Solid oxide fuel or electrolysis cell stack assembly according to feature 13, wherein the housing at least has internal stiffening and strengthening ribs, and wherein at least a part of said ribs are adapted to provide flow guidance of at least a part of the oxidant or fuel gasses.

15. Solid oxide fuel or electrolysis cell stack assembly according to any of the preceding features, wherein at least one of the at least one side of the housing is formed as at least one stiffening and strengthening profile.

16. Solid oxide fuel or electrolysis cell stack assembly according to feature 14, wherein at least one of said profile(s) provide space for further elements of the assembly such as current collectors.

17. Solid oxide fuel or electrolysis cell stack assembly according to any of the preceding features, wherein the at least one compression force mat and the at least one fixation mat is made from one or more of the following materials: of ceramic, glass, metal or a combination of these, preferably porous calcium silicate or glass fibre reinforced calcium silicate or refractory ceramic fibre or glass fibre, preferably magnesia-silica fibre, alumina fibre with or without an amount of silica, low alkali aluminosilicate compositions containing one or more of the following oxides: zirconia, chromia or titania or vermiculite.

Particular embodiments of the invention are further illustrated by the accompanying drawings showing examples of embodiments of the invention.

POSITION NUMBER OVERVIEW

| | |
|---|---|
| 100, 200, 300, 400, 500 and 600: | Cell stacks assembly (SOFC or SOEC). |
| 101, 201, 301, 401, 501, 601: | Housing. |
| 102, 202, 302, 402, 502, 602: | Flange. |
| 103, 203, 403, 503, 603: | Cell Stack (SOFC or SOEC). |
| 104, 204, 404, 504, 604: | Flexible-interface-fixture. |
| 105, 505: | Oxidant gas outlet. |
| 106, 506: | Oxidant gas inlet. |
| 107, 507: | Fuel gas inlet. |
| 108, 508: | Fuel gas outlet. |
| 209, 409, 509, 609: | Gasket. |
| 110, 210, 410, 610: | Flexible fixation mat. |
| 211, 411, 511, 611: | Flexible compression force mat. |
| 112, 312, 412, 512, 612: | Stiffening and strengthening ribs. |
| 650: | SOFC or SOEC system. |
| 652: | System flange. |
| 659: | System gasket. |

Figure 1:
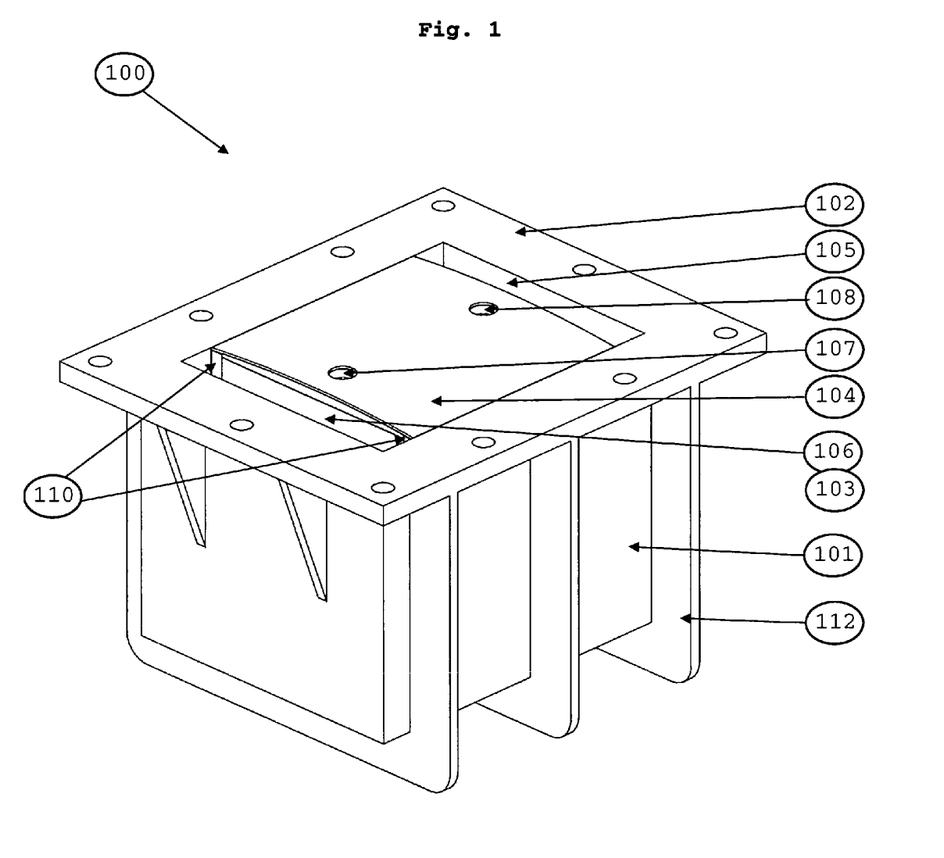
FIG. 1 shows an isometric bottom end view of the cell stack assembly according to an embodiment of the invention.

Referring to FIG. 1, one embodiment of a fuel cell stack assembly (100) is shown. A housing (101) is shown with the open bottom interface end upwards. This end is provided with a flange (102) so the cell stack assembly can be connected to an interface counterpart of an SOFC system (not shown) in a simple, safe and gas tight manner.

The fuel cell stack (103) is positioned in the housing, fixed in position by two flexible fixation mats (110) located inside the housing, one between one side of the housing and the adjacent side face of the fuel cell stack and the other located between the opposite side of the housing and its adjacent side face of the fuel cell stack. In this manner the fuel cell stack is squeezed between the two flexible fixation mats and thereby at least to some extent kept in position by the friction forces. The fuel cell stack is further fixed in its position in the housing by the flexible compression force mat (not shown) located inside the housing between the top end and the top face of the fuel cell stack. The compression force mat presses the fuel cell stack towards the opposite open bottom interface end of the housing where the flexible-interface-fixture (104) in form of a thin steel plate is reacting to the compression force with a counter-force is to some extent bend outwards because of its flexibility. In this embodiment, the flexible-interface-fixture has a width corresponding to the inside width of the flange. As shown on FIG. 1, the fuel cell stack is not in operation and therefore the flexibility of the flexible-interface-fixture plate is thus relative small as compared to the operation state where the temperature is considerably higher.

The fuel cell stack of the embodiment shown in FIG. 1 is a combined external (air) and internal (fuel) manifolded stack. Oxidant gas such as ambient air is led to the side manifolded oxidant gas inlet of the fuel cell stack via the oxidant gas inlet (106) and is led away from the fuel cell stack via the oxidant gas outlet (105). The assembly is simple and robust in its construction since no actual external manifolds are necessary: The flexible fixation mats not only fix the fuel cell stack, but also ensures a gas tight seal between the housing side and the fuel cell stack, hence the external manifolds are constituted by the void between the side of the housing and the external manifold sides of the fuel cell stack. Fuel is led to and from the fuel cell stack via the fuel gas inlet (107) and the fuel gas outlet (108). As can be seen, all process gas connections are located on the same side of the assembly, the interface end of the housing. The interface as shown is a plane surface where the flange side and the external side of the flexible-interface-fixture are located in the same plane. The housing and the flange is stiffened by the stiffening and strengthening ribs (112) which make it possible to reduce the thickness of both the housing walls and the flange and thus the thermal mass and the material costs.

Figure 2:
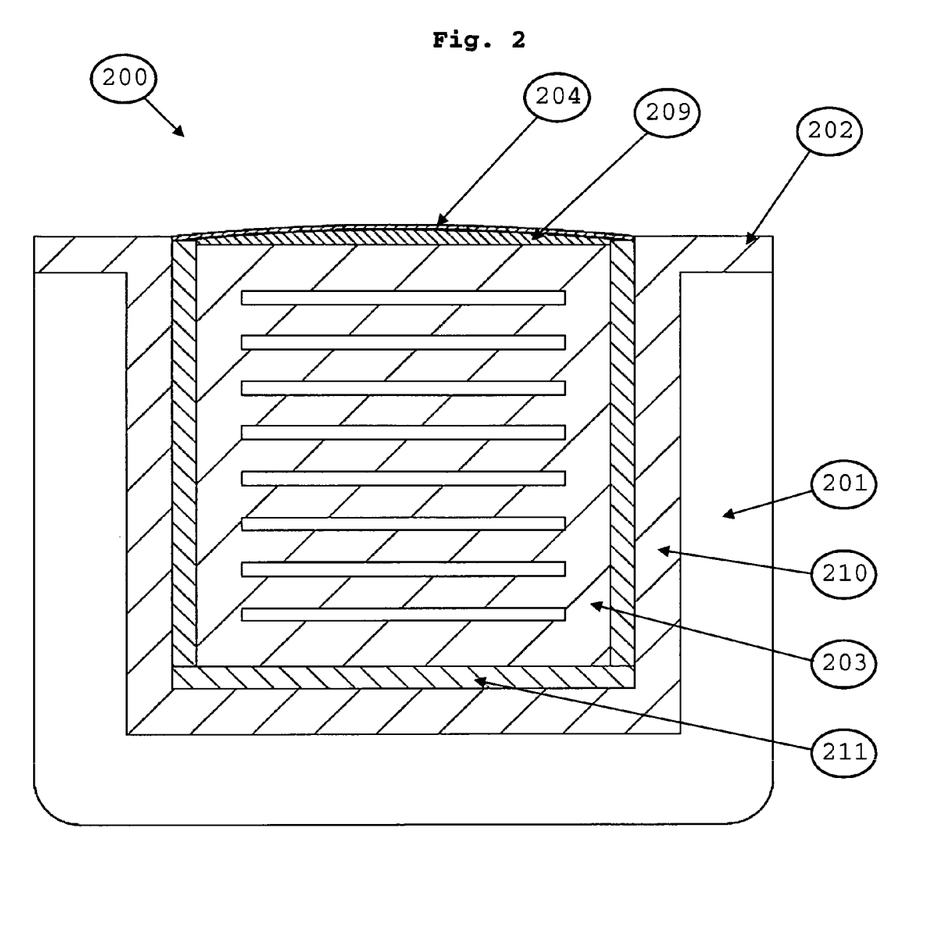
FIG. 2 shows a cut side view of the cell stack assembly according to an embodiment of the invention.

Turning to FIG. 2, the same embodiment of the invention is now shown in a cut side view of the assembly, which enables the showing of the flexible compression force mat (211). It is visible that a fuel gas gasket (209) is located between the fuel cell stack (203) top face and the flexible-interface-fixture (204). The flexible-interface-fixture is here shown plane. As mentioned, it is more flexible and therefore more forces transferring when in operation, but still a slight, not shown, bend is possible also when not in operation. The fuel gasket is compressed by the compression force from the flexible compression force mat. As mentioned, flexible fixation mats (210) are located between two of the fuel cell stack side faces and two of the housing (201) sides to ensure fixation and gas sealing between the oxidation gas inlet side and the oxidation gas outlet side. In this embodiment, the housing has an indent at the open bottom interface end for location of the flexible-interface-fixture.

Figure 3:
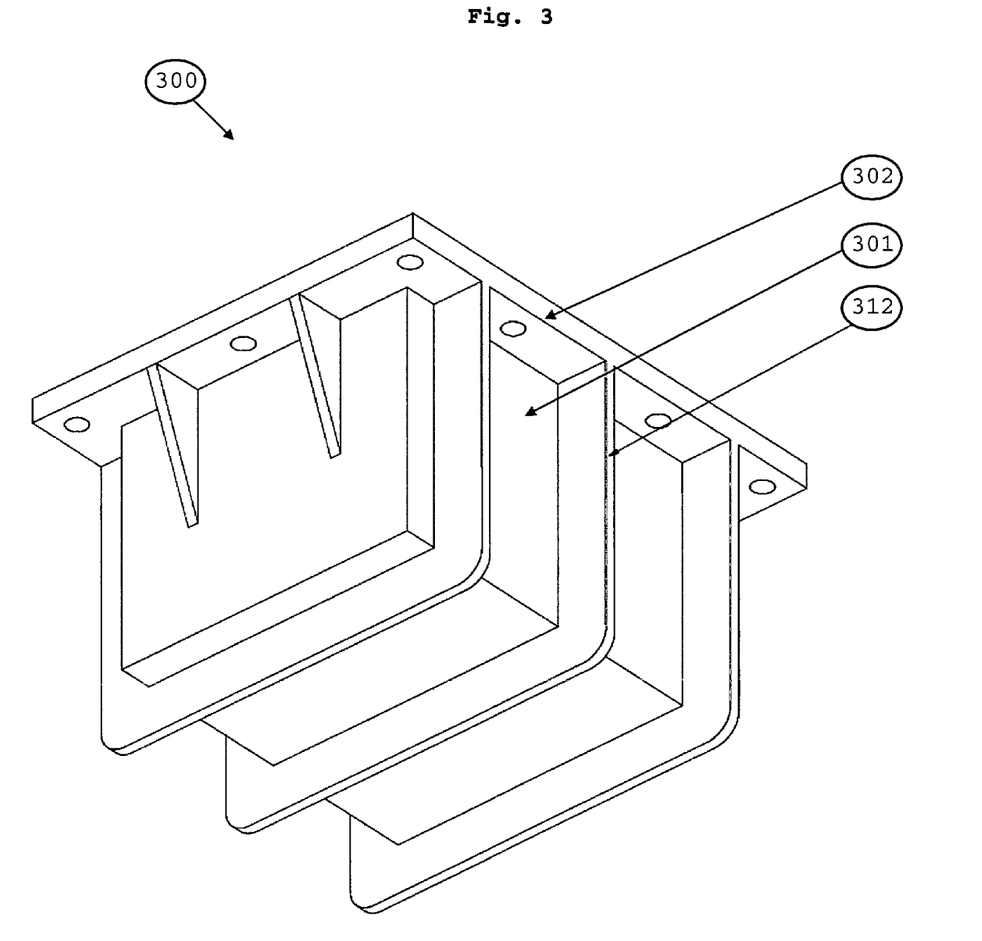
FIG. 3 shows an isometric top end view of the cell stack assembly according to an embodiment of the invention.

On FIG. 3 the external top end of the housing (301) is visible as well as two of the housing sides. The housing and the flange (302) for connection to a SOFC system interface counterpart is integrated, as is the stiffening and strengthening ribs (312). This embodiment can have cast steel housing. Not shown are the current collectors, which provides the electrical power output from the fuel cell. The terminals for the current collectors can be located on the top end of the housing. But other locations of the current terminals, such as the sides or the interface side of the assembly (to keep all connections on the same side) are also possible.

Figure 4:
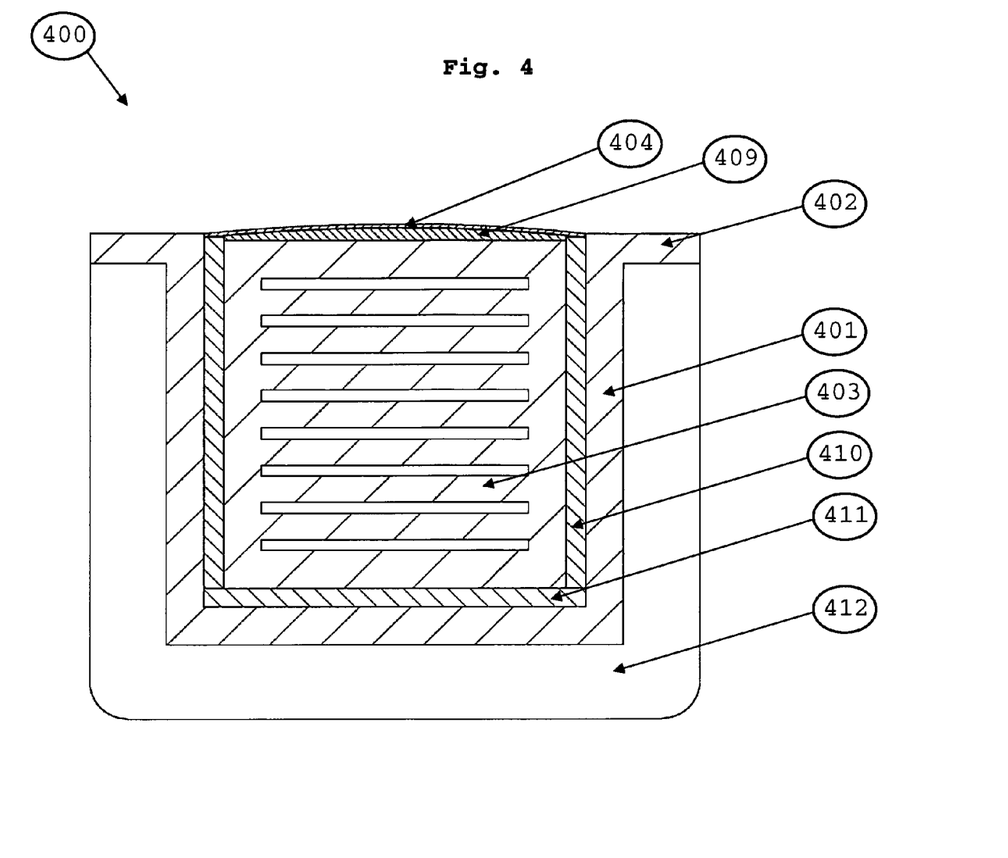
FIG. 4 shows an cut side view of the cell stack assembly according to an embodiment of the invention.

FIG. 4 shows a cut side view of the assembly (400) as in FIG. 2, but here the deflection of the flexible-interface-fixture (404) is shown. The flexible-interface-fixture is in this embodiment a steel plate. It is exposed to a force from the flexible compression force mat (411) via the cell stack (403) and the gasket (409), and as the thermal mass of the plate is kept low, the force bends the plate. As seen on FIG. 4, the housing (401) has in this embodiment no indent for location of the plate. In stead the plate fits inside the housing and can be welded in a position where the surface of the flexible-interface-fixture is plane with the flange (402) as shown. Also two flexible fixation mats (410) is shown as is a stiffening and strengthening rib (412) which goes around two sides and the closed top end of the housing. The stiffening and strengthening ribs also serves to lower the thermal mass of the housing as compared to housing without ribs and thus the necessity for thicker walls and the ribs can serve as cooling ribs for the housing.

Figure 5A:
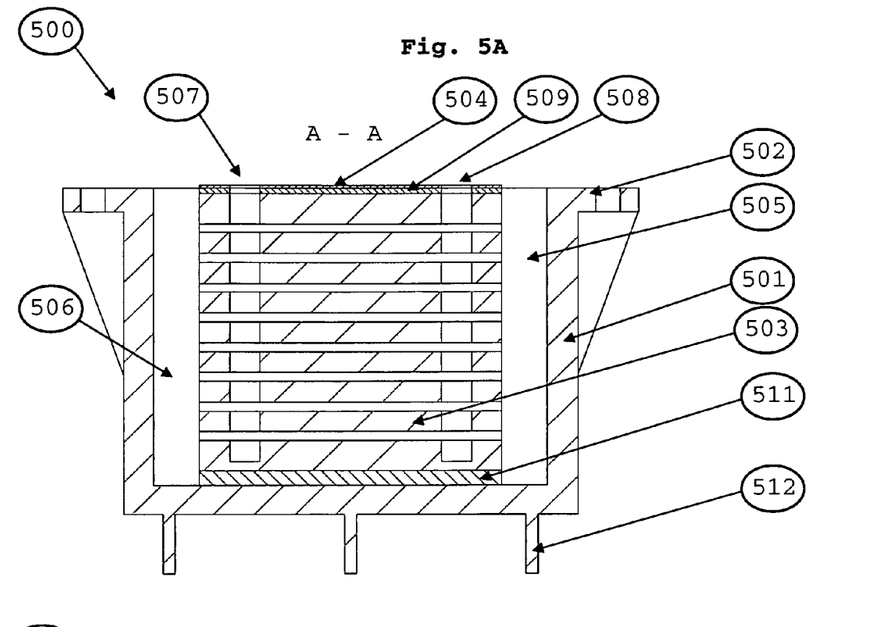
FIG. 5A shows an cut side view of the cell stack assembly as shown on FIG. 5B according to an embodiment of the invention.
Figure 5B:
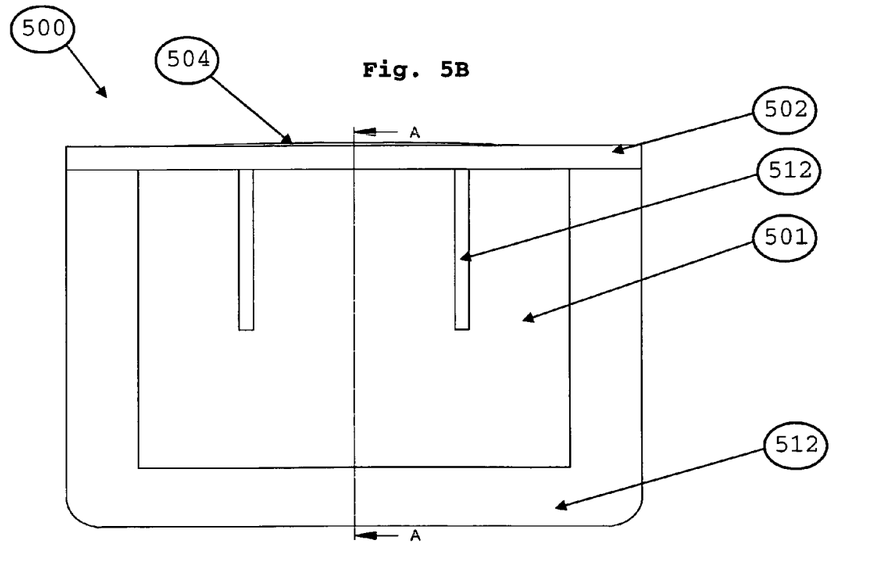

In FIG. 5A a side cut view of the cell stack assembly (500) in FIG. 5B is shown. The cut is made where the deflection of the flexible-interface-fixture (504) due to the force from the flexible compression force mat (511) is at its maximum and therefore the distance from the surface of the flange (502) to the surface of the flexible-interface-fixture is quite visible in the cut. Between the flexible-interface-fixture and the cell stack (503) is a sealing gasket (509). The cell stack of this embodiment is a co-flow stack, which means that the oxidant gas flow direction is the same as the fuel gas flow direction, in this case from left to right in FIG. 5A. Hence the oxidant gas inlet (506) and the fuel gas inlet (507) is located in the left side of the assembly and the oxidant gas outlet (505) and the fuel gas outlet (508) is located in the right side of the assembly. As seen on FIG. 5A, the cell stack is a combined internal and external manifolded stack: the fuel gas side (anode) of the stack has internal manifolding and the oxidant gas side (cathode) of the stack has external manifolding. According to the invention the external manifolds are simply the void between the cell stack and the housing (501). Some of the stiffening and strengthening ribs (512) are round-going on two sides and the closed top end of the housing, whereas others are located only adjacent to the flange. They serve to stiffen and strengthen the housing but also to stiffen and strengthen the flange, which otherwise should have been made in larger dimensions. Hence the thermal mass is kept low.

Figure 6:
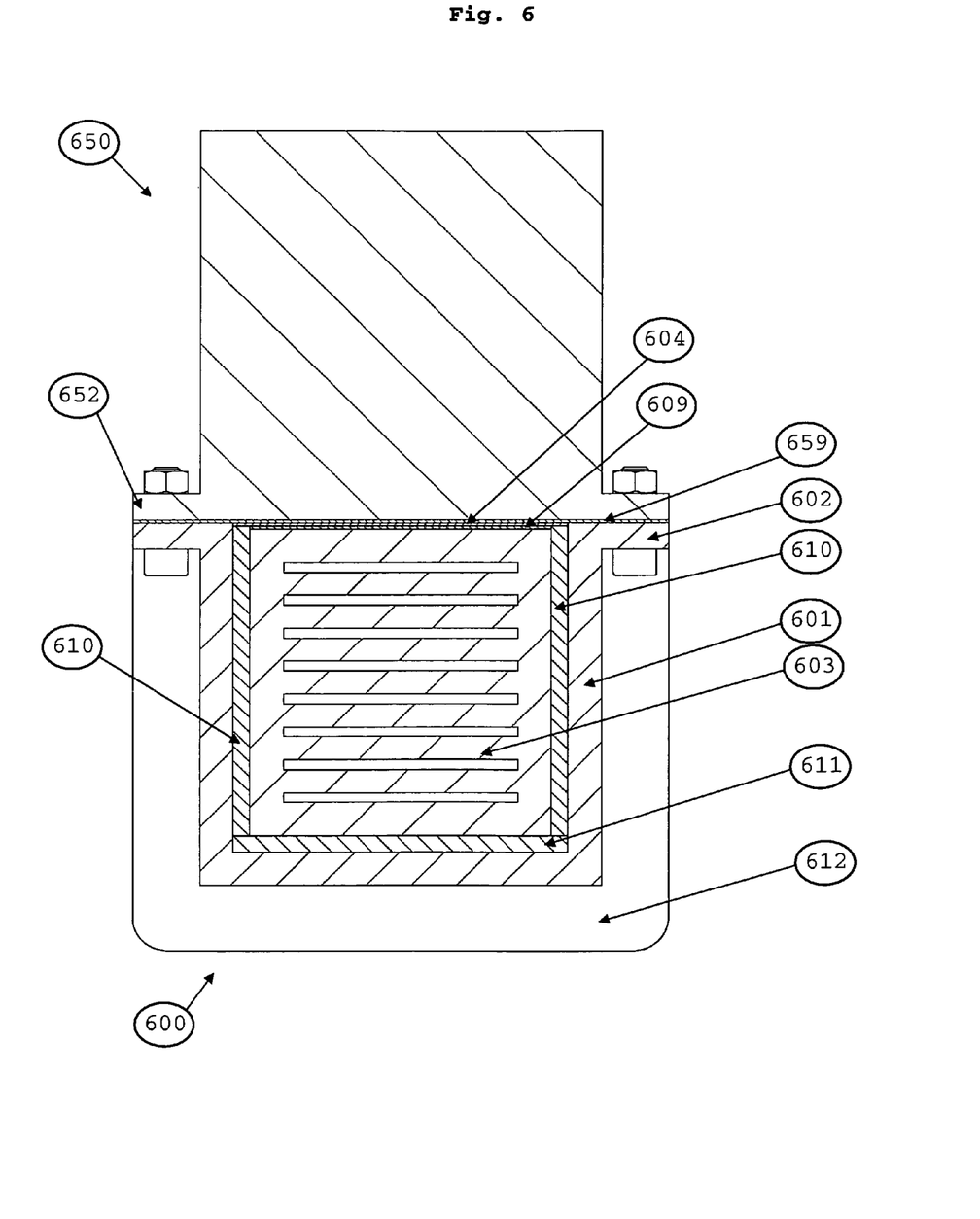
FIG. 6 shows a cut side view of the cell stack assembly when mounted on an SOFC or SOEC system according to an embodiment of the invention.

In FIG. 6 the cell stack assembly (600) is shown in side cut view with the interface connected to an SOFC or SOEC system (650) to illustrate how the flexible-interface-fixture ((604) is plane and in the same plane as the flange (602) when the flange (602) is connected to the system flange (652) and at least a part of the force from the flexible compression force mat (611) is countered by the connection/packing force from the system flange. As described, the force from the flexible compression force mat is transmitted to the flexible-interface-fixture via the cell stack (603) whereby it provides both a sealing force to the gaskets as well as a stack compression force. Apart from the gasket (609) already described in the foregoing, also a system gasket (659) is shown, both gaskets providing sealing between the flanges and the gas connections. Hence, because of the flexible nature of the flexible-interface fixture, a large thermal mass is omitted since the counter-pressure is provided by the connected system, which in any case needs to be rigid enough to provide a sealing force. The side cut on FIG. 6 also shows the two flexible fixation mats (610) between the cell stack and the housing (601) which serves to fix the stack in the correct position and provides gas seal between the oxidation gas inlet and outlet side of the cell stack. A stiffening and strengthening rib (612) as explained before is also shown.

EXAMPLES

For a SOFC stack with the cell dimensions 120×120 mm calculations were made for a flexible-interface-fixture in the form of a steel plate with a thickness of 0.1 mm and 5 mm:

Flexural stiffness of the flexible-interface-fixture. The stiffness is based on the plate equation:

$$D = \frac{E \times h^3}{12(1-v^2)}$$

$$E = 200.000 \frac{N}{mm^2}$$

-continued $$v = 0.31$$
$$h_1 = 0.1 \text{ mm}$$
$$D_1 = 0.02 \text{ Nm}$$
$$h_2 = 5 \text{ mm}$$
$$D_2 = 2304.83 \text{ Nm}$$

Where E is the elastic modulus for the chosen steel plate, h is the thickness of the steel plate and v is the Poisson's ratio.

Experiments were done with a flexible-interface-fixture thickness of 3 mm showing both satisfying cell stack compression and sealing.

The invention claimed is:

1. A solid oxide fuel or electrolysis cell stack assembly for connection to a solid oxide fuel or electrolysis cell system, said assembly comprising
    at least one solid oxide fuel or electrolysis cell stack, the at least one stack comprises a plurality of fuel cells or electrolysis cells, the at least one stack comprises a top face, a bottom face, a plurality of side faces, fuel gas inlet, fuel gas outlet, oxidant gas inlet and oxidant gas outlet,
    a rigid housing with one closed top end, one open bottom interface end opposite the closed end and a plurality of sides, the housing enclosing the at least one stack top face and the plurality of side faces, the open bottom interface end is adapted to be connected to an interface counterpart of said solid oxide fuel or electrolysis cell system and provides interface for fuel gas and oxidant gas between the at least one stack and said system,
    a plurality of flexible compression force mats positioned inside the housing, at least one of said flexible compression force mats positioned between the at least one stack top face and the closed top end of the housing and at least one of said flexible compression force mats positioned adjacent a stack side face, the compression force mats providing compression force for the at least one stack,
    flexible fixation mats positioned inside the housing and respectively abutting two opposing stack side faces and corresponding sides of the housing to fix the at least one stack in the housing, and
    a flexible-interface-fixture positioned adjacent to the open bottom interface end of the housing that at least partly encloses the at least one stack within the housing and at least partly covers the bottom face of the at least one stack, the flexible-interface-fixture having a thickness in the range of 0.1-3 mm and a flexural stiffness of between 0.1 Nm and 1000 Nm.

2. The assembly according to claim 1, wherein said open bottom interface end of the housing and said flexible-interface-fixture are planar, parallel and has an external interface surface which is in the same plane when connected to the interface counterpart of the solid oxide fuel or electrolysis cell system.

3. The assembly according to claim 1, wherein said open bottom interface end of the housing is provided with an outwardly extending flange for connection to the interface counterpart of the system as an integrated part of the housing, or attached to the housing by means of welding, bracing, screws, or as a loose flange with a mechanical fit around the housing.

4. The assembly according to claim 1, wherein the flexible-interface-fixture is a steel plate connected to the open bottom interface end of the housing.

5. The assembly according to claim 1, wherein the flexible-interface-fixture is connected to the housing by means of welding, bracing, screws or a mechanical fit.

6. The assembly according to claim 1, wherein the width of the flexible-interface-fixture corresponds to the inner width of the open bottom interface end of the housing, whereby the flexible-interface-fixture is mounted inside said open bottom interface end of the housing.

7. The assembly according to claim 1 further comprising at least one gasket between the bottom face of the at least one stack and the flexible-interface-fixture to provide a sealing between at least one fuel or oxidant gas inlet or outlet of the at least one stack and the flexible-interface-fixture, and wherein the flexible compression force mat provides a gas tight seal of said gasket when the assembly is connected to the interface counterpart of said system and the at least one stack is in operation.

8. The assembly according to claim 1, wherein the at least one stack has external manifolding for the oxidant gas and internal manifolding for the fuel gas, one side face of the at least one stack has external manifold oxidant gas inlet, one side face of the at least one stack has external manifold oxidant gas outlet and the bottom face of the at least one stack has internal manifold fuel gas inlet and internal manifold fuel gas outlet.

9. The assembly according to claim 1, wherein the at least one stack has external manifolding for both the oxidant gas inlet and outlet and the fuel gas inlet and outlet, and wherein the at least one flexible fixation mat provides a gas sealing between at least two of the gas inlets and outlets of the at least one stack.

10. The assembly according to claim 1, wherein the at least one stack has internal manifolding for both the oxidant gas inlet and outlet and the fuel gas inlet and outlet.

11. The assembly according to claim 1, wherein the housing is made by casting, deep-drawing, selective laser melting or welding, and wherein the housing is provided with stiffening and strengthening external and/or internal ribs.

12. The assembly according to claim 11, wherein the housing at least has internal stiffening and strengthening ribs, and wherein at least a part of said ribs are adapted to provide flow guidance of at least a part of the oxidant or fuel gasses.

13. The assembly according to claim 1, wherein at least one of the at least one side of the housing is formed as at least one stiffening and strengthening profile.

14. The assembly according to claim 13, wherein at least one of said profile(s) provide space for current collectors.

15. The assembly according to claim 1, wherein the at least one compression force mat and the at least one fixation mat is made from one or more of the following materials: ceramic, glass, metal or a combination thereof.

16. The assembly according to claim 1, wherein the flexural stiffness of the flexible-interface-fixture is between between 1 Nm and 500 Nm at 20° C.

17. The assembly according to claim 1, wherein the at least one compression force mat and the at least one fixation mat is made from one or more of the following materials: porous calcium silicate or glass fibre reinforced calcium silicate or refractory ceramic fibre or glass fibre.

18. The assembly according to claim 1, wherein the at least one compression force mat and the at least one fixation mat is made from one or more of the following materials:

magnesia-silica fibre, alumina fibre with or without an amount of silica, low alkali aluminosilicate compositions containing one or more of the following oxides: zirconia, chromia or titania or vermiculite.

\* \* \* \* \*